United States Patent [19]

Schmidt et al.

[11] Patent Number: 5,121,887
[45] Date of Patent: Jun. 16, 1992

[54] COMFORT MECHANISM FOR SEAT BELT RETRACTOR ASSEMBLY

[75] Inventors: Timothy J. Schmidt, Troy; Cecil A. Collins, Shelby Township, Macomb County, both of, Mich.

[73] Assignee: General Safety Corporation, St. Clair Shores, Mich.

[21] Appl. No.: 584,065

[22] Filed: Sep. 18, 1990

[51] Int. Cl.⁵ .............................................. B60R 22/44
[52] U.S. Cl. ............................... 242/107.6; 242/107.7
[58] Field of Search .......... 242/107.6, 107.7, 107.12; 280/806, 807

[56] References Cited

U.S. PATENT DOCUMENTS

| | | | |
|---|---|---|---|
| 4,002,311 | 1/1977 | Fisher et al. | 242/107.7 |
| 4,059,242 | 11/1977 | Tanaka | 242/107.7 X |
| 4,124,175 | 11/1978 | Cislak | 242/107.7 |
| 4,206,888 | 6/1980 | Magyar | 242/107.7 |
| 4,261,530 | 4/1981 | Asai et al. | 242/107.4 R |
| 4,856,728 | 8/1989 | Schmidt et al. | 242/107.7 X |

*Primary Examiner*—John M. Jillions
*Attorney, Agent, or Firm*—Harness, Dickey & Pierce

[57] ABSTRACT

A safety belt retractor for providing motor vehicle occupant protection is disclosed. The retractor has a rotatable spool for storing safety belt webbing and a rewind spring for exerting a retraction force on the belt webbing. The retractor also includes a comfort mechanism for releasing tension on the belt webbing which is exerted by the rewind spring. The comfort mechanism is actuated in response to a deliberate motion exerted on the belt webbing which is different than belt movements normally associated with operation of the retractor.

24 Claims, 5 Drawing Sheets

_Fig-3_

_Fig-8A_

_Fig-8B_

_Fig-9_

COMFORT MECHANISM FOR SEAT BELT RETRACTOR ASSEMBLY

BACKGROUND AND SUMMARY OF THE INVENTION

This invention relates to an automotive safety belt retractor and particularly, to one having an improved comfort mechanism and a method of operating the same.

Most motor vehicles are equipped with seat and shoulder belt systems which act to restrain the occupants when the motor vehicle is subjected to high rates of deceleration which may occur, for example, during a motor vehicle collision. Many modern day safety belt retractor assemblies are of the emergency locking retractor (ELR) type. Typically, these retractors employ an inertia sensitive actuator which prevents the belt webbing from being withdrawn when the vehicle is subjected to deceleration forces above a predetermined level, thereby restraining the vehicle occupant. However, during normal operating circumstances, the belt webbing may be controllably withdrawn from the retractor for enabling increased freedom of movement by the vehicle occupants. As such, emergency locking retractors provide improved ride comfort and convenience for the occupants.

Modern safety belt retractor assemblies are also frequently equipped with a tension relief device or so-called "comfort" mechanism which prevents the retractor from constantly exerting a retracting force on the belt webbing which tends to be uncomfortable and annoying to the occupants. These systems typically sense the magnitude and direction of belt movement for triggering actuation of the comfort mechanism. Thereafter, the "slack" generated by the comfort mechanism can be cancelled by withdrawing a predetermined length of the belt from the retractor. One exemplary type of "comfort" mechanism includes a rotatable cam and follower type mechanism which allows the retractor to introduce "slack" into the belt when the vehicle is being operated.

In view of the foregoing, there is a need to provide an improved comfort mechanism for safety belt retractors which requires a conscious "intentional" and "deliberate" act by the occupant for actuating the comfort mechanism to set the belt slack. As such, the seat belt retractor of the present invention will not permit tension relief until the improved comfort mechanism is actuated with a deliberate and intentional act by the vehicle occupant.

It is therefore an object of the present invention to provide a method and apparatus for intentionally actuating a comfort mechanism of a seat belt retractor assembly.

The improved comfort mechanism in accordance with this invention achieves the above-mentioned desirable feature through the use of a follower or locking member which interacts with a driven member. A pivotable shutter device is located intermediate the follower and the driven member such that the follower is adapted to normally engage the shutter to orient the comfort mechanism in a "non-actuated" position. Therefore, tension relief is prohibited during normal protracted and retracted movement of the seat belt upon movement of the occupant in the vehicle since the shutter acts to inhibit the follower from engaging the driven member. Upon extracting the belt to its full extended position, an intentional and deliberate "tug" or "snapping" of the belt causes the shutter to pivot to an "actuated" position whereby the follower is permitted to engage the driven member for thereafter providing tension relief in a known manner.

Additional benefits and advantages of the present invention will become apparent to those skilled in the art to which this invention relates from the subsequent description of the preferred embodiments and appended claims, taken in conjunction with the accompanying drawings.

BRIEF DESCRIPTION OF THE DRAWINGS

FIGS. 4 through 7 are partially cut-away side elevations of the retractor assembly shown in FIG. 2 illustrating the comfort mechanism in various phases of operation, in which FIG. 4 represents the normal "non-actuated" position of the comfort mechanism, FIG. 5 shows the comfort mechanism in the "actuated" position, FIGS. 6 and 7 show normal operation of the comfort mechanism and a method for cancelling the comfort feature and returning the various component to the "non-actuated" position of FIG. 4, respectively;

DETAILED DESCRIPTION OF THE INVENTION

Figure 1:
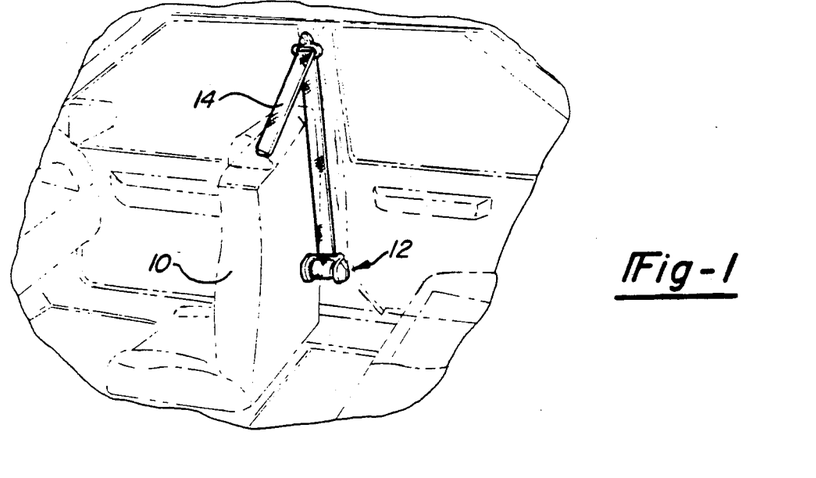
FIG. 1 is a partial interior view of a vehicle showing a seat back and the retractor assembly of the present invention.

Referring to FIG. 1, a portion of the interior of an exemplary motor vehicle is shown to include a seat 10 and a retractor assembly generally indicated at 12 mounted on a vertical pillar on the interior of the motor vehicle in a conventional manner. A shoulder belt webbing 14 projects from retractor assembly 12 and is adapted to extend over the shoulder and across the chest of the vehicle occupant for fastening to a seat buckle. As is known in the art, a separate retractor assembly (not shown) is provided for the occupants lap belt.

Figure 2:
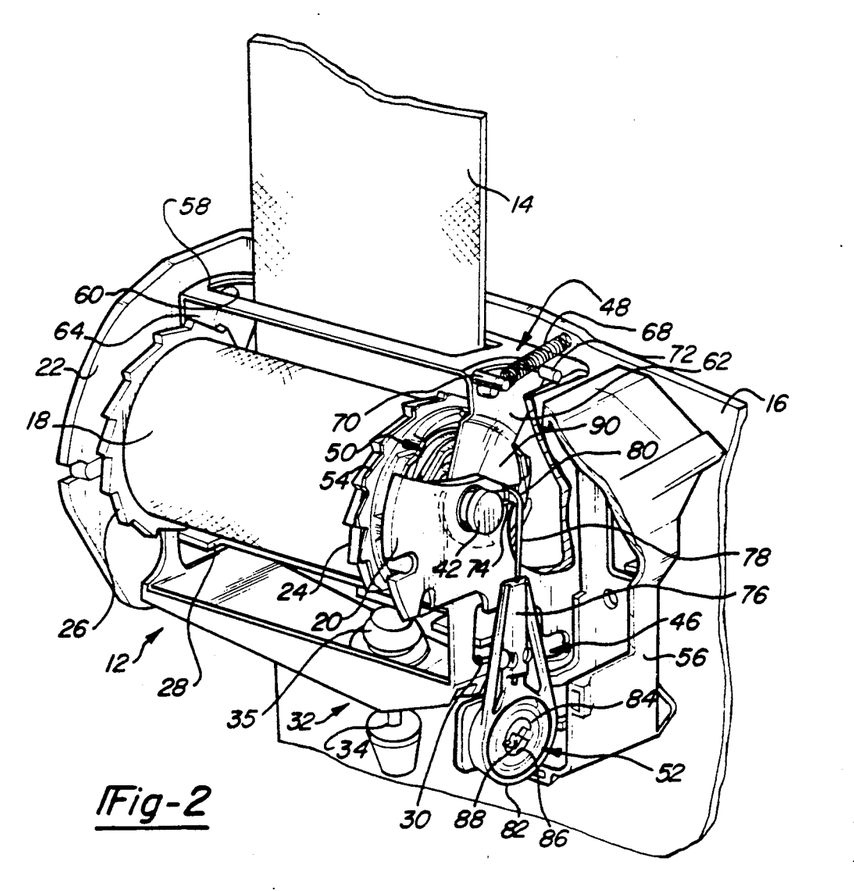
FIG. 2 is a partially cut-away pictorial view of the retractor assembly shown in FIG. 1 equipped with an improved comfort mechanism according to a preferred embodiment of the present invention.
Figure 3:
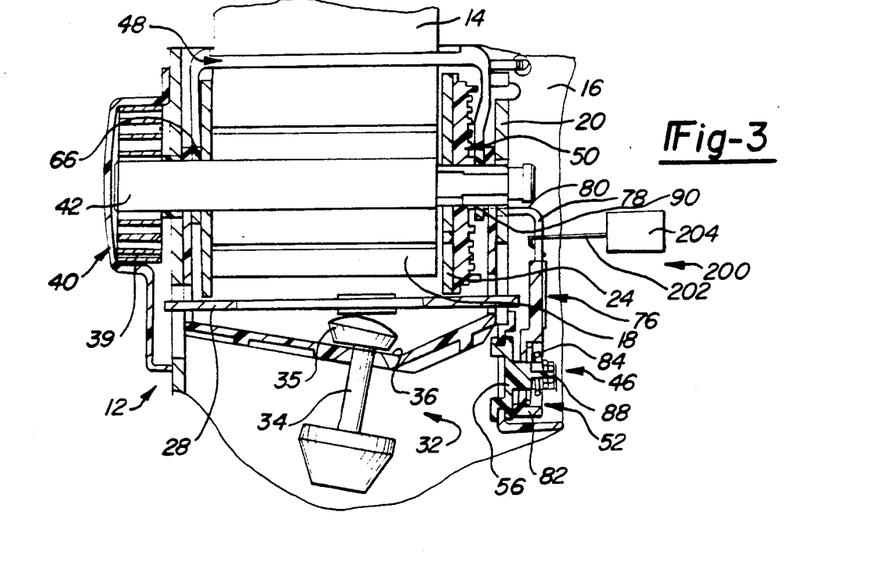
FIG. 3 is a vertical cross-sectional view of FIG. 2.

With particular reference now to FIGS. 2 and 3, retractor assembly 12 is shown to include retractor frame 16, to which a spool type belt retractor apparatus generally indicated at 18 is rotatably mounted. In particular, retractor frame 16 includes a pair of upstanding side plates 20 and 22 which support spool 18 for rotation. The ends of spool 18 include toothed sprockets 24 and 26 which are provided for interacting with inertial locking mechanism 32 associated with retractor 12. Locking bar 28 pivots at socket 30 from a normal position disengaged from the teeth of sprockets 24 and 26 to a position of engagement with the sprockets for inhibiting continued extension or withdrawal of belt 14 from retractor assembly 12. Preferably, the present invention is adapted to be used with an emergency locking retractor (ELR) 32 for allowing belt 14 to be readily spooled out to provide comfort and convenience for the motor vehicle occupants and which can be locked to inhibit withdrawal of belt 14 when the vehicle is exposed to a deceleration force above a predetermined threshold. An exemplary emergency locking retractor 32 is shown to include an inertia pendulum 34 having an actuation head 35 which normally rests in socket 36 of pendulum support member 38. In the event of deceleration above a predetermined level, pendulum 34 pivots about actuation head 35 causing it to act on locking bar 28 for urging it into locking engagement with sprockets 24 and 26. It will be appreciated that ELR 32 is merely exemplary in nature and that retractor assembly 12 can be equipped with any suitable emergency locking device known in the art.

A rewind spring 39 housed within spring assembly 40 acts upon spool support shaft 42 to rotatably bias spool 18 such that a normal retracting force is generated upon withdrawal of shoulder belt 14 from retractor assembly 12. One end of belt 14 is attached to spool 18 and becomes rolled thereon as spool 18 is rotated by spring assembly 40.

Retractor assembly 12 further includes a so-called "comfort" mechanism 46 which relieves the tension force exerted on belt 14 by rewind spring 39 for enhancing occupant comfort and convenience. Comfort mechanism 46 is shown to be associated with retractor frame side plate 20 and principally includes a driven member or comfort cam 50 and a follower or comfort pawl assembly 52. Comfort cam 50 and comfort pawl assembly 52 shown associated with comfort mechanism 46 are generally equivalent to that described by U.S. Pat. Nos. 4,002,311 and 4,856,728, issued to the assignee of this application and which are hereby incorporated by reference. It will be appreciated that the present invention is not to be limited to the structure of comfort mechanism 46 since other "comfort" mechanisms known in the retractor art can be readily substituted therefor.

Comfort cam 50 is shown secured for rotation to an outer face surface of sprocket 24. The peripheral edge of comfort cam 50 is provided with "shadow" teeth 54 which assist in reducing audible clashing of sprocket 24 with locking bar 28 upon actuation of ELR 32. Comfort pawl assembly 52 is shown to be supported and enclosed in a housing 56 attached to side plate 20 and a rearward surface of frame 16.

According to the principles of the present invention, a shutter 48 is pivotally supported intermediate the driven member and the follower of the comfort mechanism and is adapted to inhibit actuation of the comfort mechanism until a deliberate motion is exerted on the belt webbing that is different than belt movements associated with normal retractor operation. More particularly, shutter 48 is pivotally supported intermediate comfort cam 50 and comfort pawl assembly 52. As will be described hereinafter in greater detail, utilization of shutter 48 in retractor assembly 12 promotes improved control of the method for "actuation" of comfort mechanism 46.

Shutter 48 is generally a U-shaped member having a central leg 58 defining an elongated aperture 60 through which belt 14 extends. Shutter 48 has two downturned legs 62 and 64 respectively attached between sprockets 24 and 26 and side plates 20 and 22, respectively. In particular, downturned legs 62 and 64 have a concentrically aligned bore 66 through which support shaft 42 extends and about which shutter 48 is pivotably supported. Means for biasing shutter 48 in a first direction include a spring member 68 secured between a post 70 formed on shutter 48 and a portion of frame 14 for normally biasing shutter 48 rearwardly until second post 72 engages an upper surface of side plate 20. Side plate 20 defines a generally arcuate slot 74, shown partially cut-away (FIG. 2) through which a stylus 76 of comfort pawl assembly 52 extends.

Figures 4, 5:
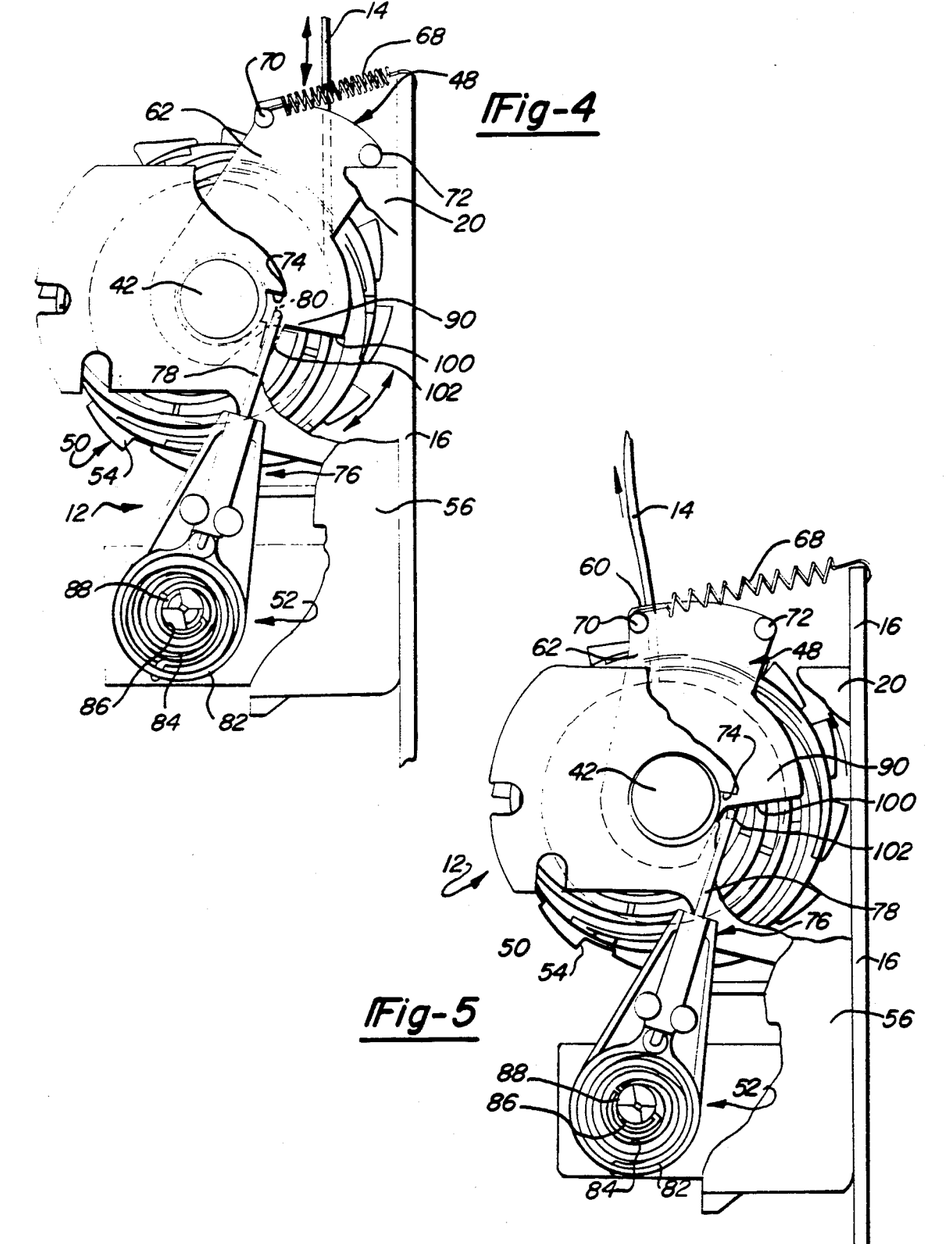

Stylus 76 includes a radially projecting arm 78 and a bent over stylus tip 80. Comfort pawl assembly 52 further includes a spring housing 82 and a conical torsion spring 84. Spring housing 82 has an aperture 86 through which a pivot post 88 formed on housing 56 extends. Torsion spring 84 is connected between pivot post 88 and spring housing 82 for biasing stylus 76 in a radially inward direction with respect to spool 18 and cam 50 as well as for urging stylus tip 80 into axial engagement with the tracks of comfort cam 50 following "actuation" of comfort mechanism 46. However, prior to "actuation" of comfort mechanism 46, stylus tip 80 is biased by torsion spring 84 into engagement with an outer planar surface extension 90 of shutter 48 as is best shown in FIG. 4. In this "neutral" position, stylus 76 is inhibited from interacting with the tracks of comfort cam 50. As such, comfort mechanism 46 is in a "nonactuated" condition such that tension relief of belt 14 is prohibited. Under normal retractor operating conditions, as shown in FIG. 4, belt 14 can be retracted and withdrawn through aperture 60 without pivoting shutter 48 to the "actuated" position of FIG. 5.

As previously stated, shutter 48 is designed to require an "intentional" and "deliberate" input or act on the part of the vehicle occupant to actuate the tension relief feature of a comfort mechanism. With reference to FIG. 5, an exemplary method of applying the intentional and deliberate act required for actuating comfort mechanism 46 is shown. In particular, following conventional fastening of belt 14 to a seat buckle (not shown), belt 14 is extracted to its full length of travel. Following complete withdrawal of belt 14 from spool 18, the occupant is required to impart or exert a deliberate motion, such as a firm "tug", on belt 14. The firm "tug" generates an inertial force which rotates spool 18 to an over-center position such that belt 14 acts on shutter 48 to forcibly pivot shutter 48 in a second direction in opposition to the biasing of spring member 68. In essence, shutter 48 is utilized to sense a deliberate motion (i.e., "tug") exerted on belt 14 that is different than natural belt motions and "actuate" comfort mechanism 46 in response thereto. More specifically, shutter 48 is pivotably moved for disengaging stylus tip 80 therefrom such that torsion spring 84 biases stylus tip 80 axially inwardly to engage the tracks of comfort cam 50. Thereafter, spring member 68 biases shutter 48 to pivot in the first direction toward stylus 76 such that upon subsequent release of belt 14 for retraction onto spool 18, transverse edge surface 100 of shutter 48 engages bent-over tip 80 as it moves radially with the tracks. Therefore, upon pivotable movement of shutter 48 in the second direction, comfort mechanism 46 is defined to be "actuated" such that tension relief of belt 14 is permitted.

Figures 6, 7:
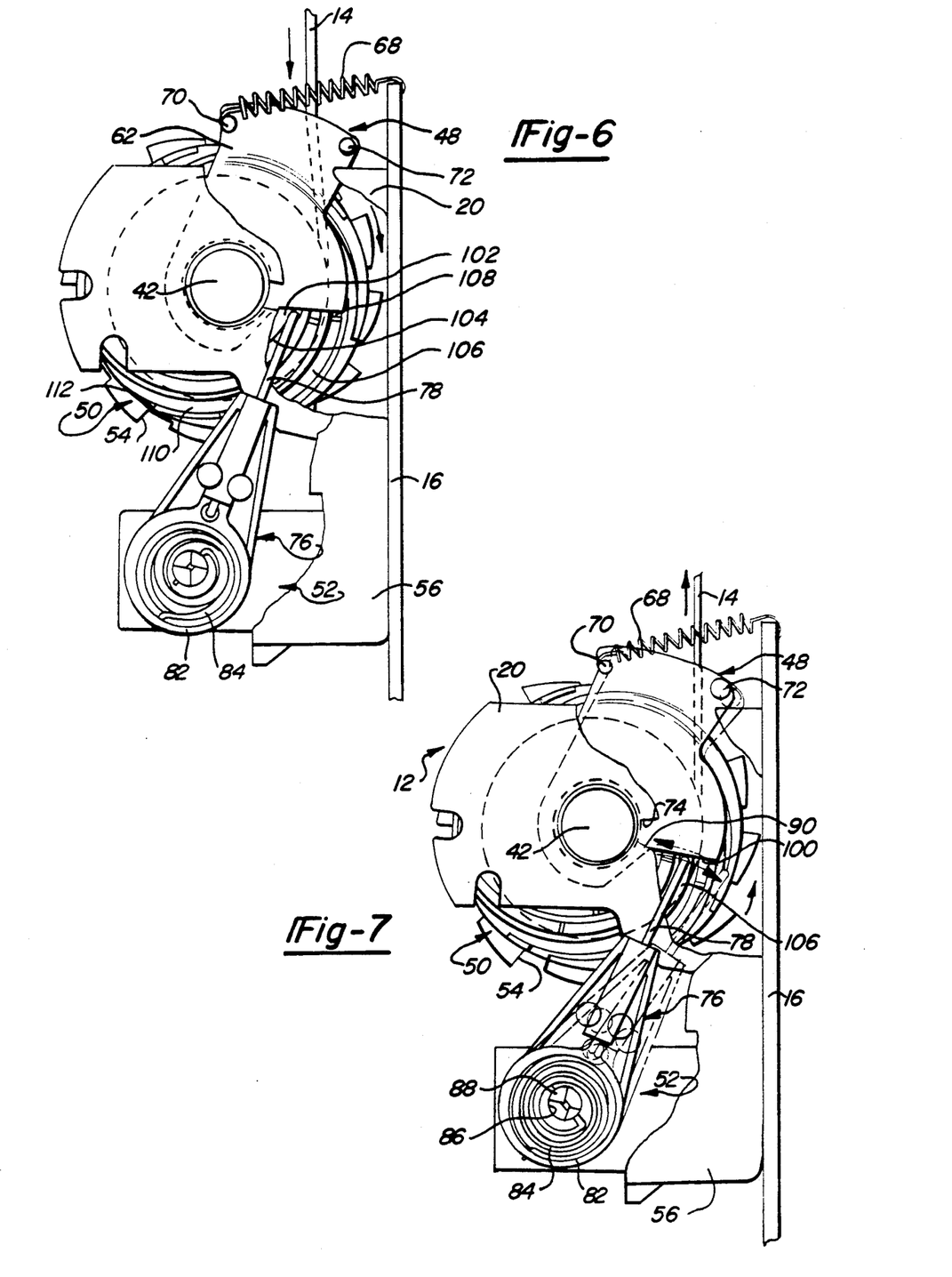

Since the general configuration and operation of comfort pawl assembly 52 relative to the tracks formed on comfort cam 50 is explained in detail with reference to U.S. Pat. No. 4,002,311, a generalized description of a method of operation of comfort mechanism 46 in the manner herebefore detailed as it relates to the present invention is provided. In particular, following "actuation" of comfort mechanism 46 in the manner herebefore detailed, stylus tip 80 is biased into and adapted for slidingly engaging various tracks of comfort cam 50. Stylus tip 80 initially enters a center or "idle" track 102 (FIG. 5). Upon belt retraction, following "actuation" of comfort mechanism 46 by the occupant's deliberate act, stylus tip 80 immediately exits idle track 102 and enters a control track 104 (FIG. 6). Continued retraction results in stylus tip remaining within control track 104 until belt 14 assumes an initial confining or "taut" position against the occupant in the form of belt tension applied by rewind spring 39. Thereafter, limited extension of belt 14 permits stylus tip 80 to move from control track 104 into one of a plurality of radially spaced locking tracks 106 each of which communicate with control track 104. Stylus tip 80 rides in one of locking tracks 106 and over a locking ramp 108 for inhibiting further retraction of belt 14 from spool 18, thus relieving belt tension and setting spool 18 at a desired comfort latch position. At the radially outward end of locking tracks 10 6, an exit track section 110 and an exit ramp 112 are provided.

FIG. 6 illustrates the normal retraction of belt 14 following actuation of comfort mechanism 46 to rest belt 14 across the shoulders or chest of the occupant. An audible clicking sound can be heard as stylus tip 80 steps over a plurality of spaced control ramps 114 (see FIG. 9) formed on control track 104 during retraction. The clicking is an indication that comfort mechanism 46 has been actuated.

FIG. 7 illustrates means for setting the tension relief and cancelling the comfort feature. Withdrawal of a preselected length of belt 14 by the occupant following normal retraction, such as by leaning forward, sets a preselected amount of slack for relieving the belt tension. The amount of permissible slack can be varied according to different vehicle applications but is preferably less than about one inch. Comfort mechanism 46 has a memory feature such that withdrawal of less than a predetermined maximum length of belt 14 will return belt 14 to the desired slack position. Upon withdrawal of a greater amount of belt 14 than the predetermined maximum, the comfort feature is cancelled and retractor assembly 12 returns to a normal operation mode wherein belt 14 is "taut" against the occupant and stylus 76 is in the "neutral" position of FIG. 4. In particular, the comfort feature can be cancelled through subsequent withdrawal of a predetermined length of belt 14 for permitting stylus tip 80 to ride over exit ramp 112 on exit track section 110. Such withdrawal causes stylus tip 80 to be axially positioned above the outermost axial surface of comfort cam 50 and planar surface 90 of shutter 48. As such, torsion spring 84 acts to bias stylus 76 to ride over planar surface 90 of shutter 48 to return comfort mechanism 46 to its "non-actuated" condition.

Following cancellation of the comfort feature upon extraction of a length of belt 14 in excess of the predetermined maximum, shutter 48 is biased to return to the position of FIG. 4 such that stylus 76 snaps back radially inwardly to its central "neutral" position.

This invention provides an improvement over conventional comfort mechanisms in that variations in the torsional and compressive loads of torsion spring 84 heretobefore permitted the stylus 76 to enter an intermediate locking track upon cancellation of the comfort feature. This undesirable condition is eliminated by improved comfort mechanism 46 since, following cancellation, stylus tip 80 rides on surface 90 of shutter 48 so as to be blocked from engagement with comfort cam 50. Another significant feature of improved comfort mechanism 46 is that retractors having conventional comfort mechanisms can be readily modified to include shutter 48.

Figure 8A:
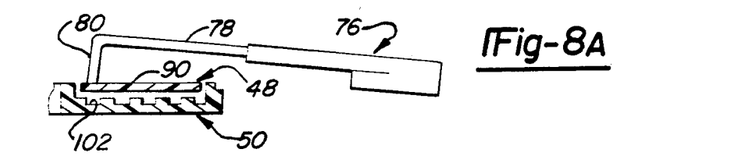
FIGS. 8A and 8B schematically illustrate the relative positioning of the various components of the improved comfort mechanism in the "actuated" and "non-actuated" positions.
Figures 8B, 9:
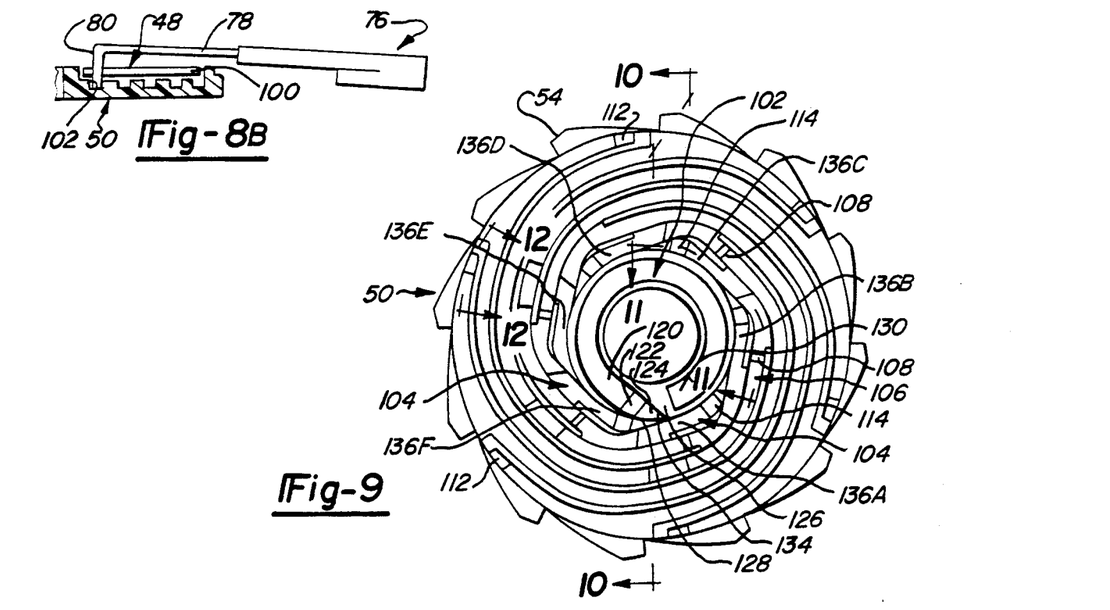
FIG. 9 is an enlarged plan view of an exemplary comfort cam of the present invention.
Figure 10:
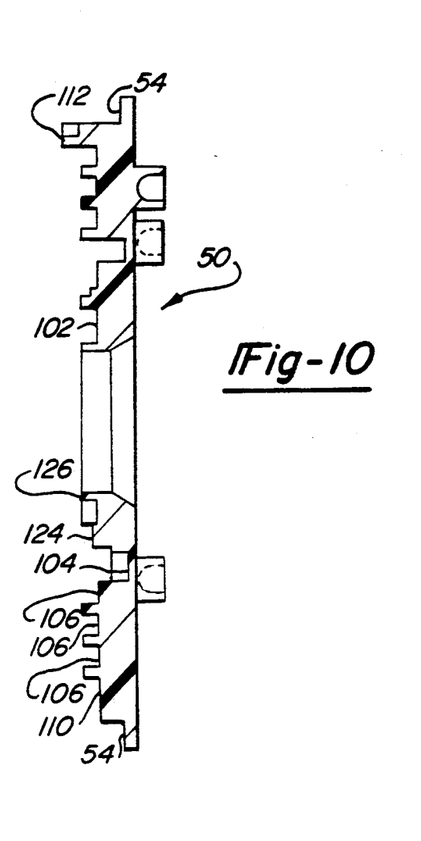
FIG. 10 is a cross-sectional view taken substantially along line 10—10 of FIG. 9.
Figure 11:
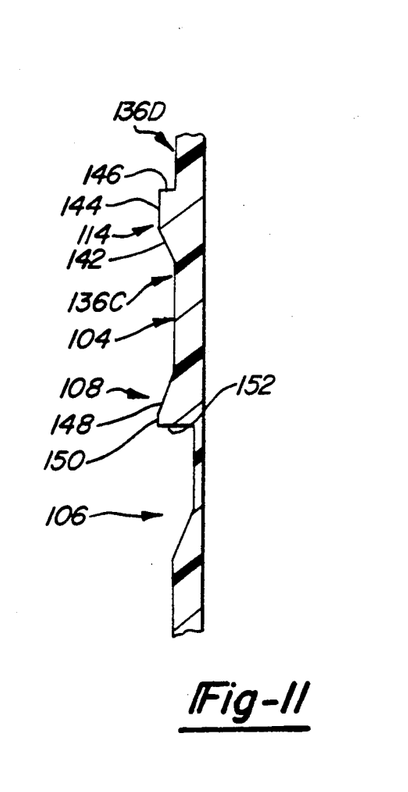
FIG. 11 is an enlarged cross-sectional view taken substantially along line 11—11 of FIG. 9.
Figure 12:
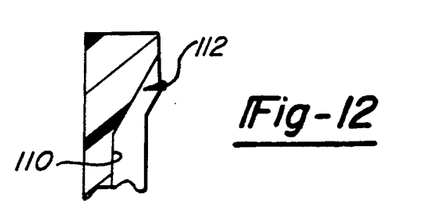
FIG. 12 is an enlarged cross-sectional view taken substantially along line 12—12 of FIG. 9.

FIGS. 8A and 8B schematically illustrate the relative positioning of stylus 76 and shutter 48 relative to cam 50 between the normal "non-actuated" and the deliberately "actuated" positions.

Referring now to FIGS. 9 through 12, an exemplary embodiment of comfort cam 50 is illustrated in greater detail. However, it is to be understood that the configuration and communicating arrangement of the tracks of cam 50 in cooperation with stylus 76 are exemplary in nature and may be readily modified to fulfill the requirements of various vehicular applications. In addition, the terms "clockwise" and "counterclockwise" will be used for descriptive purposes only.

In general, comfort cam 50 is shown to include idle track 102 which is generally circuitous in form and is substantially concentric with the center of comfort cam 50 except for an end indicated at 120 (FIG. 9) which is adapted to provide unidirectional communication with control track 104. End 120 of idle track 102 is formed with an upwardly extending escape ramp 122 (counterclockwise) which terminates in a flat 124 aligned below axial surface 126 of comfort cam 50. Flat 124 communicates with control track 104 with a stop wall 128 formed at the juncture therebetween for inhibiting stylus tip 80 from re-entering idle track 102 upon entering control track 104.

A downwardly extending ramp 130 (counter-clockwise) is formed at the opposite end of idle track 102. The upper portion of ramp 130 terminates at axial surface 126 of comfort cam 50. Continuation of surface 126 drops into end 120 of idle track 102 and which are separated by stop wall 134.

Control track 104 is shown to include six sections 136A through 136F. Each of the sections 136 unidirectionally communicate with the others upon clockwise rotation (retraction) of comfort cam 50 by means of control ramps 114 formed on one end thereof each having upwardly extending ramp surfaces 142 (counter clockwise) and flats 144 terminating in stop shoulders 146. The opposite end of each section 136 is adapted to communicate with one of a plurality of six locking tracks 106. As such, the radially spaced plurality of sections 136 associated with control track 104 permit tension relief of belt 14 at any rotational position of spool 18 and, in turn, comfort cam 50. Each Locking track 106 includes locking ramp 108 having an upwardly extending (clockwise) ramp surface 148, flat 150 and stop shoulder 152. Locking tracks 106 are recessed forward of stop shoulder 152 to assist in inhibiting stylus tip 80 from reentering control track 104 following entry into a locking track 106. Locking tracks 106 are generally in the form of a spiral which terminate at the periphery of comfort cam 50 in an exit ramp 112 which is provided for positioning stylus tip 80 in an axial position above surface 126 of comfort cam 50 and radially outward of shutter 48.

With continued reference to FIG. 9, operation of the comfort mechanism 46 will now be described. More specifically, as belt 14 is withdrawn, comfort cam 50 is rotated in a counter-clockwise direction. During such rotation, stylus tip 80 rests on planar surface 90 of shutter 48 until control mechanism 46 is deliberately "actuated" as hereinbefore described. Stylus 76 will remain disengaged from cam 50 during operation of retractor assembly 12 until the deliberate actuation of comfort mechanism 46. Following such actuation, comfort cam 50 rotates in a clockwise direction to retract belt 14 to a taut position relative to the chest of the occupant. Initial retraction causes stylus tip 80 to move from idle track 102 over escape ramp 122, flat 124, and drop into track section 136A of control track 104 ahead of stop wall 128. Thus, stylus tip 80 is prevented from returning into idle track 102. Continued retraction of belt 14 to a snug position against the occupant causes stylus tip 80 to successively ride over control ramps 114, flats 142 and stop shoulders 144 of successive sections 136A through 136F such that stylus tip 80 will continue to circulate in control track 104 so long as belt 14 continues to retract.

Thereafter, withdrawal of a selected length of belt 14 by the occupant causes a relative counter-clockwise rotation of comfort cam 50 which causes stylus tip 80 to move over a locking ramp 108 and past a stop shoulder 152 associated with one of lock tracks 106. Therefore, when the occupant releases belt 14, a slight amount of retraction may occur until stylus tip 80 is lockingly abutted against stop shoulder 152 for inhibiting any further retraction of belt 14. As noted, comfort mechanism 46 may be cancelled by the occupant thereafter withdrawing belt 14 such that comfort cam 50 rotates in a counter-clockwise direction until stylus tip 80 rides over exit ramp 112 to snap back radially inwardly over shutter 48 to its initial "neutral" position.

Furthermore, to assure the cancellation of comfort feature in any position of stylus tip 80 within tracks 106 without manipulation of belt 14 when the seat belt is unlatched, a release mechanism 200 is provided. This release mechanism 200 is diagrammatically illustrated (FIG. 3) as including a release member 202 engaging stylus 76 and a control device 204 adapted for selectively moving release member 202 from a first position allowing stylus 76 to engage cam 50 to a second position for displacing stylus 76 from cam 50. Incorporated U.S. Pat. No. 4,002,311 describes an exemplary device for lifting or disengaging stylus 76 from whichever of the tracks it may be disposed in and allowing stylus 76 to snap back to its initial "non-actuated" neutral position.

While the above description constitutes a preferred embodiment of the present invention, it will be appreciated that the invention is acceptable to modification, variation and change so as to be incorporated into most conventional comfort mechanisms without departing from the proper scope and fair meaning of the accompanying claims.

What is claimed is:

1. A safety belt retractor for providing motor vehicle occupant protection comprising:
   a rotatable spool for storing safety belt webbing;
   rewind spring means for exerting a retraction force on said belt webbing;
   comfort means for releasing tension on said belt webbing exerted by said rewind spring means, said comfort means having a first member rotatable with said spool and a second member movable with respect to said first member, said comfort means having a non-actuated mode wherein said second member is disengaged from said first member for permitting said rewind spring means to exert said retraction force on said belt webbing, and said comfort means having an actuated mode wherein said second member is in engagement with said first member for relieving tension exerted by said rewind spring means on said belt webbing, and said comfort means having an actuated mode wherein said second member is in engagement with said first member for relieving tension exerted by said rewind spring means on said belt webbing;
   an actuation member acting on said second member, said actuation member being movable between a first position for retaining said comfort means in said non-actuated mode in response to movement of said belt webbing associated with normal operation of said retractor, and a second position for shifting said comfort means into said actuated mode in response to a seat occupant imparting a deliberate protractive movement on said belt webbing following substantially complete withdrawal thereof from said spool; and
   biasing means for normally biasing said actuation member toward said first position.

2. The safety belt retractor of claim 1 wherein said second member of said comfort means comprises a stylus and said first member of said comfort means is a cam plate supported for rotation with said spool and having a plurality of tracks formed thereon, said stylus being operable to engage said tracks when said actuation member is in said second position, and said stylus being displaced from said tracks when said actuation member is in said first position.

3. The safety belt retractor of claim 2 wherein said actuation member comprises a shutter supported for pivotable movement between said first and second positions with respect to said stylus and said cam plate, said shutter being biased by said biasing means to said first position so as to be disposed intermediate said stylus and said cam plate when said comfort means is in said non-actuated mode, whereby said deliberate protractive movement exerted by said seat occupant on said belt webbing causes said shutter to pivot toward said second position and out of its intermediate orientation for enabling said stylus to engage said tracks of said cam plate for placing said comfort means in said actuated mode.

4. The safety belt retractor of claim 3 wherein said cam plate includes a ramp surface associated with an outer peripheral section of said tracks over which said stylus rides upon withdrawal of a predetermined length of said belt webbing from said spool following relief of tension on said belt webbing, said ramp surface adapted to permit said shutter to pivot to said first position whereby said stylus returns to a position displaced from said cam plate.

5. The safety belt retractor of claim 2 further comprising cancelling means for permitting said seat occupant to return said comfort means to said non-actuated mode following operation thereof in said actuated mode such that said actuation member moves to said first position.

6. The safety belt retractor of claim 2 further comprising inertia sensitive means for inhibiting extension of said belt webbing from said retractor when said retractor is subjected to a deceleration load above a predetermined level.

7. The safety belt retractor of claim 2 further comprising release means acting on said stylus for moving said stylus out of engagement with said cam plate in response to said seat occupant unbuckling said belt webbing, whereby said biasing means acts to move said actuation member toward said first position such that said comfort means is returned to said non-actuated mode.

8. A tension relief mechanism for use with a safety belt retractor of the type having a rotatable spool for storing safety belt webbing and a rewind spring for exerting a retraction force on the belt webbing, said tension relief mechanism comprising:
   a first member rotatable with the spool;
   a second member movable between a first position disengaged from said first member for permitting the rewind spring to exert the retraction force on the belt webbing and a second position engaged with said first member for relieving tension exerted on the belt webbing by the rewind spring;
   first biasing means for normally biasing said second member toward said second position;
   an actuation member acting on said second member and movable between a third position wherein said second member is retained in said first position in response to movements of said belt webbing associated with normal operation of said retractor and a fourth position wherein said second member is permitted to move to said second position in response to a deliberation protractive movement imparted on said belt webbing by a vehicle operator following substantially complete withdrawal of said belt webbing from said spool; and
   second biasing means for normally biasing said actuation member toward said third position.

9. The tension relief mechanism of claim 8 wherein said first member is a comfort cam having a plurality of tracks formed on a face surface thereof, and said second member is a stylus having a tip adapted to engage said tracks of said comfort cam when said actuation member is in said fourth position.

10. The tension relief mechanism of claim 9 wherein said actuation member comprises a shutter supported for pivotable movement between said third and fourth positions with respect to said stylus and said comfort cam, said shutter being normally biased toward said third position to block said stylus tip from engaging said tracks of said comfort cam, and wherein said deliberate protractive movement exerted by said vehicle operator acts to pivot said shutter to said fourth position in opposition to said second biasing means.

11. The tension relief mechanism of claim 10 further comprising cancelling means for causing said shutter to pivot from said fourth position to said third position upon said vehicle operator withdrawing a predetermined length of the belt webbing, said cancelling means including a ramp surface formed on said comfort cam engageable with said stylus tip.

12. The safety belt retractor of claim 10 further comprising inertia sensitive means for inhibiting extension of said belt webbing from said retractor when said retractor is subjected to a deceleration load above a predetermined level.

13. The safety belt retractor of claim 11 further comprising release means acting on said stylus in opposition to said first biasing means to move said stylus toward said first position such that said second biasing means causes said actuation member to move to said third position upon said vehicle occupant unbuckling said belt webbing.

14. A safety belt retractor for providing motor vehicle occupant protection, comprising:
   a frame for mounting to a motor vehicle structure;
   a spool for storing safety belt webbing carried for rotation by said frame;
   a rewind spring exerting a torsional loading on said spool for exerting a retraction force on said belt webbing;
   a comfort mechanism having a non-actuated mode for permitting said rewind spring to exert said retraction force on said belt webbing and an actuated mode for relieving said retraction force, said comfort mechanism including a cam plate rotatable with said spool and forming tracks on a face thereof, and a stylus supported on said frame and having a tip movable between a first position disengaged from said tracks when said comfort mechanism is in said non-actuated mode and a second position engaged with said tracks when said comfort mechanism is in said actuated mode;
   comfort mechanism actuating means acting on said stylus for retaining said stylus in said first position for maintaining said comfort mechanism in said non-actuated mode until a deliberate and intentional protractive motion is exerted on said belt webbing following substantially complete withdrawal thereof from said spool that is different than movements associated with normal operation of said retractor.

15. The safety belt retractor of claim 14 wherein said comfort mechanism actuating means is a shutter movable from a third position operable for retaining said stylus in said first position to a fourth position permitting said stylus to move to said second position in response to said deliberate protractive motion, and wherein biasing means are provided for normally biasing said shutter toward said third position.

16. The safety belt retractor of claim 15 wherein said shutter is supported for pivotal movement relative to said stylus tip and said cam plate and is adapted to be located intermediate said stylus tip and said cam plate when in said third position for inhibiting engagement therebetween.

17. The safety belt retractor of claim 16 wherein said stylus tip engages an outer face surface of said shutter when said shutter is in said third position.

18. The safety belt retractor of claim 14 further comprising cancelling means associated with said cam plate for returning said comfort mechanism to said non-actuated mode in response to withdrawal of a predetermined length of said belt webbing when said comfort mechanism is in said actuated mode.

19. The safety belt retractor of claim 14 further comprising inertia sensitive means for inhibiting extension of said belt webbing from said retractor when said retractor is subjected to a deceleration load above a predetermined level.

20. The safety belt retractor of claim 14 further comprising release means acting on said stylus to move said stylus to said first position whereby said comfort mechanism is returned to said non-actuated mode upon a vehicle occupant unbuckling said belt webbing.

21. A method for deliberately actuating a comfort mechanism of a safety belt retractor comprising the steps of:
   providing a safety belt retractor having a rotatable spool for storing safety belt webbing, rewind spring means for exerting a retraction force on said belt webbing, a comfort mechanism having a non-actuated mode provided for normally permitting said rewind spring means to exert said retraction force and an actuated mode provided for selectively releasing tension exerted on said belt webbing by said rewind spring means, and actuation means for selectively shifting said comfort mechanism between said non-actuated mode and said actuated mode;

withdrawing said belt webbing from said spool for fastening to a buckling device with said comfort mechanism in said non-actuated mode;

withdrawing said belt webbing until it is substantially withdrawn from said spool;

imparting a deliberate and intentional force on said belt webbing for causing said webbing to act on said actuation means for shifting said comfort mechanism from said non-actuated mode to said actuated mode.

22. The method of claim 21 wherein said comfort mechanism includes a cam plate rotatable with said spool and forming tracks on a face thereof, a stylus move between a first position disengaged from said tracks for defining said non-actuated mode of said comfort mechanism and a second position engaged with said tracks for defining said actuated mode of said comfort mechanism for releasing tension exerted on said webbing by said rewind spring.

23. The method of claim 22 wherein said actuation means comprises a shutter that is movable between a third position for retaining said stylus in said first position in response to belt webbing movements associated with normal retractor operation and a fourth position for permitting said stylus to move to said second position in response to said deliberate force exerted on said belt webbing, and providing biasing means for normally biasing said shutter toward said third position.

24. The method of claim 23 further comprising the step of permitting a vehicle operator to return said comfort mechanism from said actuated mode into said non-actuated mode upon unfastening of said belt from said buckling device.

* * * * *

UNITED STATES PATENT AND TRADEMARK OFFICE
CERTIFICATE OF CORRECTION

PATENT NO. : 5,121,887
DATED : June 16, 1992
INVENTOR(S) : Timothy J. Schmidt et al.

It is certified that error appears in the above-identified patent and that said Letters Patent is hereby corrected as shown below:

Column 8, lines 6 - 10, claim 1, after "webbing", "," should be --;-- and delete "and said comfort means having an actuated mode wherein said second member is in engagement with said first member for releasing tension exerted by said rewind spring means on said belt webbing;"

Column 11, line 22, claim 22, after "stylus", insert --having a tip adapted to--

Signed and Sealed this

Seventh Day of September, 1993

Attest:

BRUCE LEHMAN

Attesting Officer

Commissioner of Patents and Trademarks